United States Patent [19]
Caldeira et al.

[11] Patent Number: 5,528,481
[45] Date of Patent: Jun. 18, 1996

[54] LOW NOISE MULTI-OUTPUT AND MULTI-RESONANT FLYBACK CONVERTER FOR TELEVISION POWER SUPPLIES

[75] Inventors: Paulo Caldeira, Scarsdale; Rui Liu, Croton-on-Hudson, both of N.Y.

[73] Assignee: Philips Electronics North America Corporation, New York, N.Y.

[21] Appl. No.: 483,919

[22] Filed: Jun. 7, 1995

Related U.S. Application Data

[63] Continuation of Ser. No. 190,803, Feb. 1, 1994, abandoned.

[51] Int. Cl.⁶ ............................................... H02M 3/335
[52] U.S. Cl. .............................. 363/20; 363/97; 363/131
[58] Field of Search ................................. 363/20, 21, 97, 363/131; 323/289

[56] References Cited

U.S. PATENT DOCUMENTS

| | | | |
|---|---|---|---|
| 4,788,591 | 11/1988 | Decraemer | 358/190 |
| 4,868,729 | 9/1989 | Suzuki | 363/21 |
| 5,204,504 | 4/1993 | Tanaka | 363/97 X |

OTHER PUBLICATIONS

"Measuring, Suppressing, and Filtering Common Mode Emissions in Switching–Mode Power Supplies", Nave J. Mark, In proceedings of HFPC '90, pp. 285–293.

"Design of High–Density On–Board Single– and Multi–output Multi–Resonant Converters", W. A. Tabisz and F. C. Lee, In proceeding of HFPC '90, pp. 45–57.

"Recent Developments in High–Frequency Quasi–resonant and Multi–resonant Converter Topologies", F. C. Lee, W. A. Tabisz and M. M. Jovanovic In proceedings of EPE '89, pp. 401–410.

"Non–Resonant and Resonant Coupled Zero–Voltage–Switching Converters", C. Q. Lee, R. Liu and S. Sooksatra, IEEE Trans. on Power Electronics, vol. 5, No. 4, 1990, pp. 404–412.

"Characterization and Comparison of Noise Generation for Quasi–Resonant and PWM Converters", L. Hsiu, M. Goldman, A. Witulsdi, W. Kerwin, and R. Carlstem, In proceedings of PESC '91, p. 504–509.

*Primary Examiner*—Peter S. Wong
*Assistant Examiner*—Y. Jessica Han
*Attorney, Agent, or Firm*—Edward W. Goodman

[57] ABSTRACT

A converter for supplying various output voltages for a television receiver includes a multi-resonant circuit, including a resonant inductor, the leakage inductance of a flyback transformer, and a charging capacitor (including the parasitic capacitance of a switching transistor). This arrangement relaxes the slope of the voltages in the converter resulting in reduced radiated EMI. In addition, the values of the inductor and the capacitor are adjusted so that the switching transistor turns on at zero voltage and zero current so that the switching transistor is less stressed and the converter is capable of high frequency operation. Finally, the switching signals applied to the switching transistor are subjected to a filter-delay to lessen the slope of the signals thereby also resulting in a reduction in the EMI radiated from the driving circuit.

2 Claims, 4 Drawing Sheets

LOW NOISE MULTI-OUTPUT AND MULTI-RESONANT FLYBACK CONVERTER FOR TELEVISION POWER SUPPLIES

This is a continuation of application Ser. No. 08/190,803, filed Feb. 1, 1994 now abandoned.

BACKGROUND OF THE INVENTION

1. Field of The Invention

The subject invention relates to power supplies capable of providing multiple voltage outputs for use in television receivers.

2. Description of The Related Art

Typically, in television receivers, a PWM switched-mode power supply is used to supply these multiple output voltages. U.S. Pat. No. 4,788,591 discloses such a PWM switched-mode power supply. However, since the voltage and current waveforms associated with such a supply are substantially square waves, a significant amount of EMI noise is generated in the television receivers. In fact, it has become common practice to install snubber (filter) circuits throughout the power supply circuit in the television receiver to reduce ringing and, consequently, to reduce the radiated EMI noise from the supply.

SUMMARY OF THE INVENTION

An object of the present invention is to provide a power supply for a television receiver which has multiple output voltages and exhibits reduced radiated EMI.

It is a further object of the invention to provide such a power supply having a minimum of cross regulation among the various outputs.

It is yet another object of the invention to provide such a power supply that produces a minimum amount of noise in the driving circuit.

Finally, it is another object of the present invention to provide such a power supply that is cost effective when compared to other prior art power supplies.

These objects are achieved in a multi-resonant and multi-output flyback converter comprising a flyback transformer having a primary winding and at least two secondary windings each having a series arrangement of an output diode and a filtering capacitance connected across the secondary winding, a dc voltage source having a first terminal coupled to one end of said primary winding, a switching circuit coupled between the other end of said primary winding and a second terminal of said dc voltage source, and a switching signal source coupled to said switching circuit for controlling the ON/OFF cycling of said switching circuit, characterized in that said flyback converter is multi-resonant and includes a resonant inductance in series with said one end of the primary winding, and said switching circuit comprises transistor switching means having a switching terminal for receiving a switching signal from the switching signal source, a source terminal coupled to the second terminal of said dc voltage source and a drain terminal coupled to the other end of said primary winding, and a parallel arrangement of a flyback diode and a charging capacitor coupled across the source and drain terminals of said transistor switching means, the multi-resonance of said flyback converter including the combination of the resonant inductance, a leakage inductance of the flyback transformer, and a combination of a capacitance of said charging capacitor and a parasitic capacitance of said transistor switching means.

Applicants have discovered that through the use of multi-resonance, the voltage through the flyback transformer exhibits a sine-wave type shape, as opposed to a square-wave type shape. As a result of this, there is less radiated EMI. Furthermore, due to this shape of the output voltages, the snubber circuits prevalent in television receivers may be obviated.

In addition to the above, Applicants note that by properly selecting the values of the resonant inductance and the charging capacitor, in consideration of the leakage and mutual inductances of the flyback transformer and the parasitic capacitance of the switching transistor, it can be arranged that the switching transistor turns on when the voltage across and current through the switching transistor are substantially zero. This results in less stress on the switching transistor and allows higher frequencies to be accommodated by the converter.

As a follow-on to the above, Applicants note that a further reduction in the radiated EMI may be effected by filtering and delaying the switching signal applied to the switching transistor.

BRIEF DESCRIPTION OF THE DRAWINGS

With the above and additional objects and advantages in mind as will hereinafter appear, the invention will be described with reference to the accompanying drawings, in which:

FIG. 2a shows the equivalent circuit of the circuit of FIG. 1, while

DESCRIPTION OF THE PREFERRED EMBODIMENTS

Figure 1:
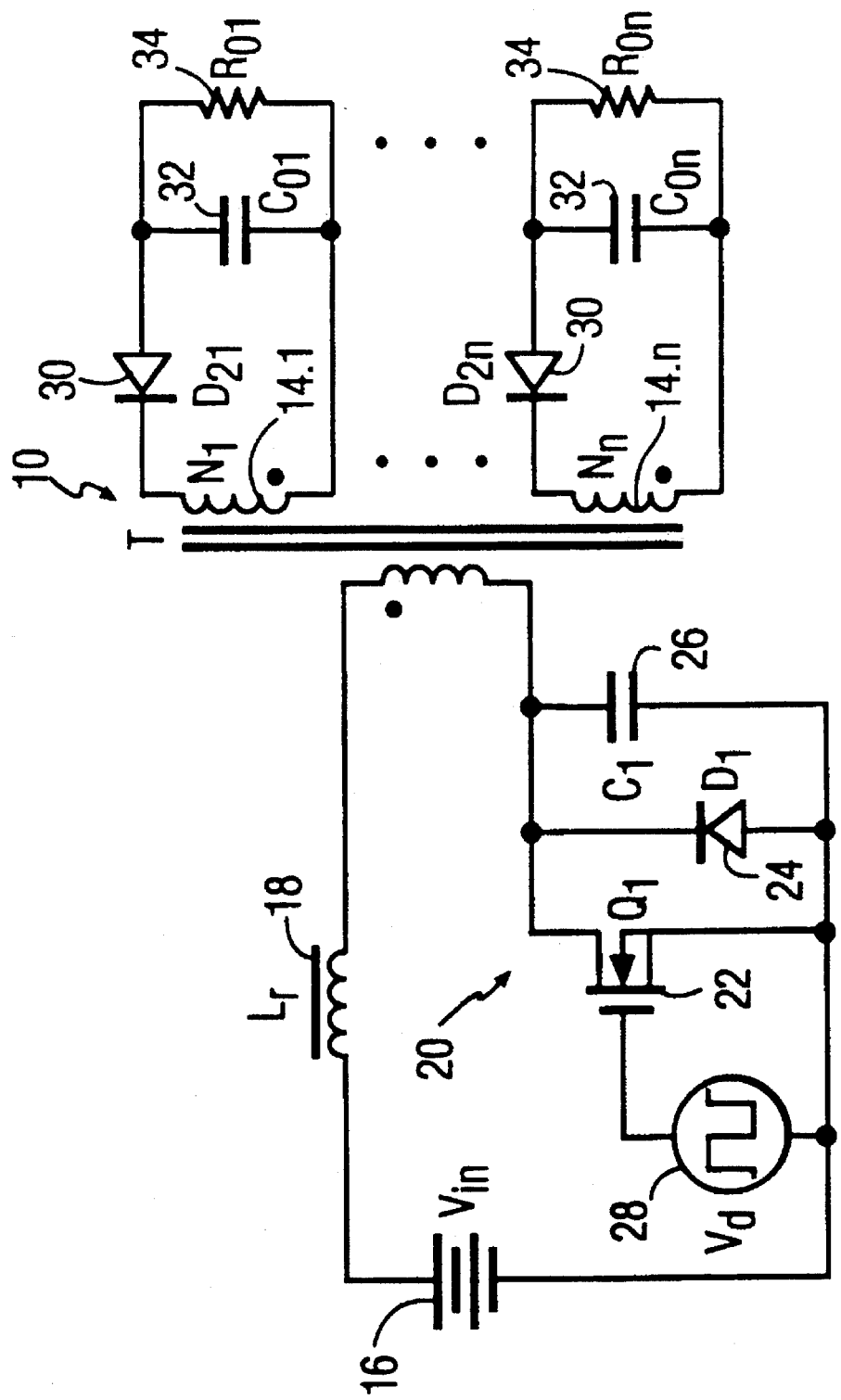
FIG. 1 shows a basic circuit diagram of the multiresonant and multi-output flyback converter of the subject invention.

FIG. 1 shows a basic circuit diagram of the multi-resonant and multi-output flyback converter of the subject invention. A flyback transformer 10 is shown having a primary winding 12 and a plurality of secondary windings 14.1–14.n. A source of dc voltage 16 is shown having its positive terminal connected through a resonant inductor 18 to one end of the primary winding 12. The negative terminal of the dc voltage source 16 is connected to the other end of the primary winding 12 through a switching circuit 20. The switching circuit 20 includes transistor switching means in the form of a MOSFET (Q1) 22 having a source electrode connected to the other end of the primary winding 12 and a drain electrode connected to the negative terminal of the dc voltage source 16. A parallel arrangement of a flyback diode (D1) 24 and a charging capacitor (C1) 26 are connected across the source and drain electrodes of the MOSFET 22. Finally, a switching signal source 28 is connected to the base of the MOSFET 22.

Each secondary winding 14.n includes the series arrangement of an output diode (D2) 30 and a filter capacitor ($C_o$) 32, a load ($R_L$) 34 being diagrammatically shown connected across each filter capacitor 32.

In order to properly design the converter circuit, the following information has be obtained in the steady state analysis:

Constant-off time of the switching transistor Q1,

Output regulation as functions of input voltage and output load,

Component stress.

To simplify the steady state analysis, the following conditions are assumed:

One output and the turn ratio ($n_1$) of the output transformer is 1:1.

The switching devices Q1, D1 and D2 are ideal. Q1 is switched at a constant-off time to ensure the zero-voltage and zero-current turn-on.

The capacitance of the output filter capacitor $C_o$ is large enough so that the output voltage $V_o$ can be considered as constant.

The converter circuit is loss-less.

Figure 2A:
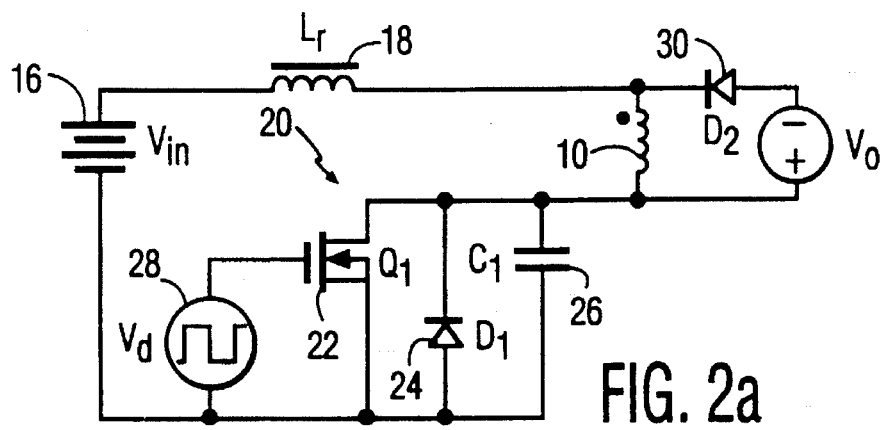
Figure 2B:
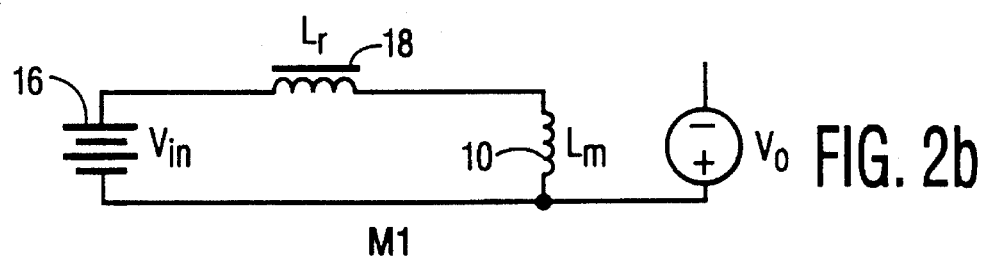
FIGS. 2b–2e depict the four linear circuit modes of the switching states of Q1, D1 and D2.
Figure 2C:
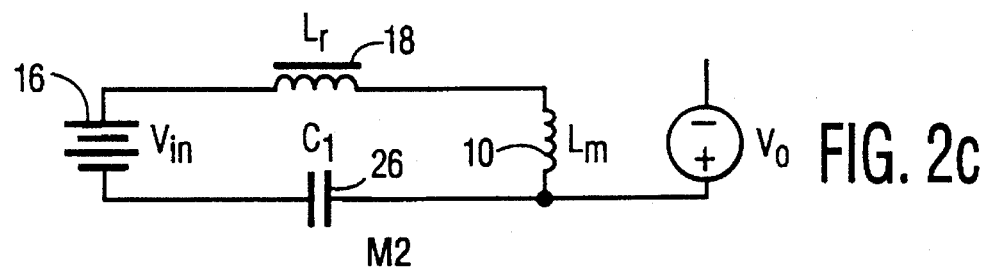
Figure 2D:
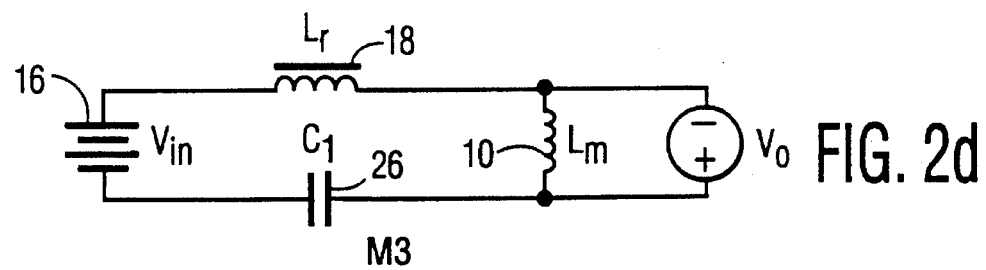
Figure 2E:
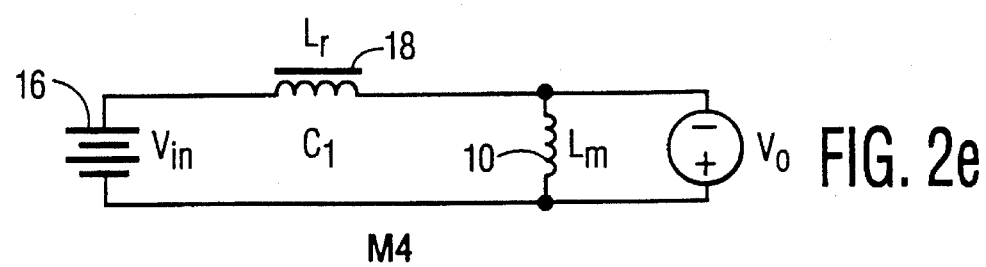

From the third assumption, the output circuit consisting of $C_o$ and $R_o$ can be replaced by a constant voltage source $V_o$. Thus, the equivalent circuit of FIG. 1 can be obtained based on the above assumptions and is shown in FIG. 2a. This equivalent circuit possess four linear circuit modes depending on the switching states of Q1, D1 and D2, as shown in FIGS. 2b–2e. Table 1 shows the conditions for the occurrence of each circuit mode. In this table, it is assumed that $t_o$ is the time when the output rectifying diode D2 becomes off, $t_1$ is the time when Q1 is turned off, $t_2$ is the time when D2 becomes on again, $t_3$ is the time when $v_c$ becomes zero, and at $t_4=t_0+T_s$, the cycle starts again.

TABLE 1

CONDITIONS FOR OCCURRENCE OF EACH CIRCUIT MODE

| Circuit Mode | Q1 | D1 | D2 | Conditions |
|---|---|---|---|---|
| M1 | On | Off | Off | Q1 is turned on <$t_0$ |
| M2 | Off | Off | Off | Q1 is turned off at $t_1$ |
| M3 | Off | Off | On | $v_{1m} = -V_0$ at $t_2$ |
| M4 | On | On | On | $v_c$ reaches 0 at $t_3$ |

Figure 3:
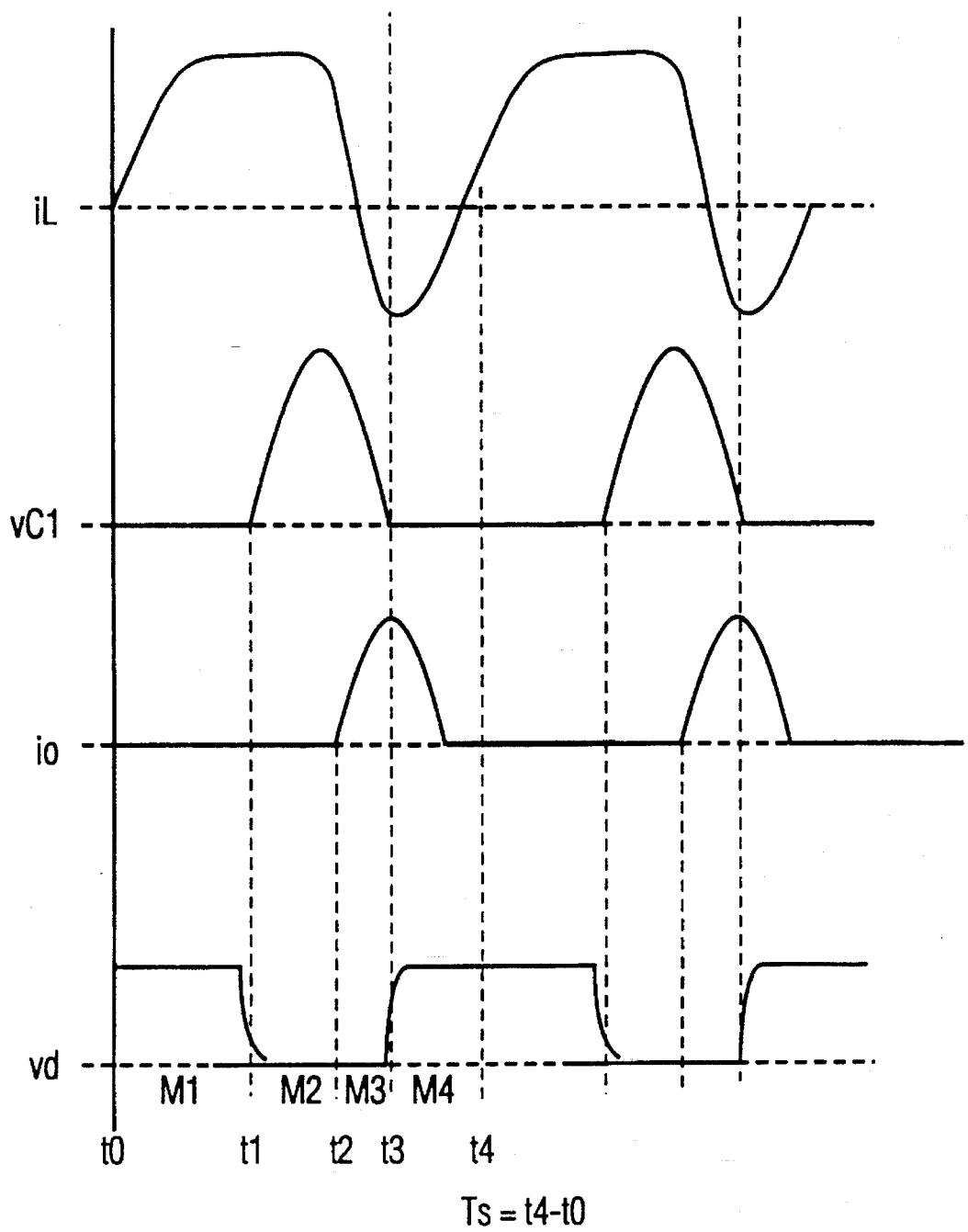
FIG. 3 shows various waveforms in the equivalent circuit diagrams of FIGS. 2a–2e.

The zero-voltage switching condition of this converter is accomplished by connecting Q1, D1 and C1 in parallel. Transistor Q1 is turned off at non-zero current. Due to the charge of C1, the voltage across Q1, i.e. $v_{c1}$, will not be built up immediately, thus resulting in a capacitively snubbed turn-off. Once Q1 is off, it should be turned on only when the flyback diode D1 is conducting to achieve zero-voltage and zero-current turn on. Therefore, it is necessary to derive information such that the time interval during which D1 is conducting is known. Waveforms of typical currents and voltages over one switching period $T_s$ and the time intervals associated with each circuit mode for the operation sequence—M1-M2-M3-M4—are shown in FIG. 3.

Based on the following design specifications:

Input Voltages—$V_{in,min}$=115 V and $V_{in,min}$=185 V;

Output Voltage—$V_{o1}$=130 V and $V_{o2}$=23 V;

Load Currents—$I_{o1}$=2.6 A and $I_{o2}$=1.2 A (full load) $I_{o1}$=1.3 A and $I_{o2}$=0.6 A (half load)

Switching Freq. - 500 kHz. it has been determined that:

C=0.53 nF $L_r$=16.75 µH $L_m$=331.33 µH

While the design of the resonant circuit is complete, the converter has only one output. These results must now be converted into a two- (or more) output case.

Since the value of $L_m$ is the mutual inductance, not the magnetizing inductance, it is necessary to calculate the primary inductance $L_p$ and the secondary inductances $L_{s1}$ and $L_{s2}$ of the flyback transformer. Since it was assumed above that the turn ratio for the one output, $n_1$, was 1:2, the turn ratio $n_2$ for the 23 V output is given by the following equation:

$$n_2 = \frac{V_{in,min}M}{V_{o2}} = 2.5$$

where M, the converter voltage gain, is selected to be 0.5. It can be shown that the relation between $L_m$ and $L_p$ is given by $$L_m = L_{m12}/L_{m13} = \frac{\frac{L_p L_p}{\sqrt{n_1 n_2}}}{\frac{L_p}{\sqrt{n_1}} + \frac{L_p}{\sqrt{n_2}}} = \frac{L_p}{\sqrt{n_1} + \sqrt{n_2}}$$

Substituting the values of $n_1$, $n_2$ and $L_m$, into the above equation results in $L_p$=758 µH. With $L_p$ known, $L_{s1}$ and $L_{s2}$ can be easily calculated from the following equations:

$$L_{s1} = \frac{L_p}{n_1^2} = 3.03 \text{ mH}; L_{s2} = \frac{L_p}{n_2^2} = 121 \text{ µH}$$

Figure 4:
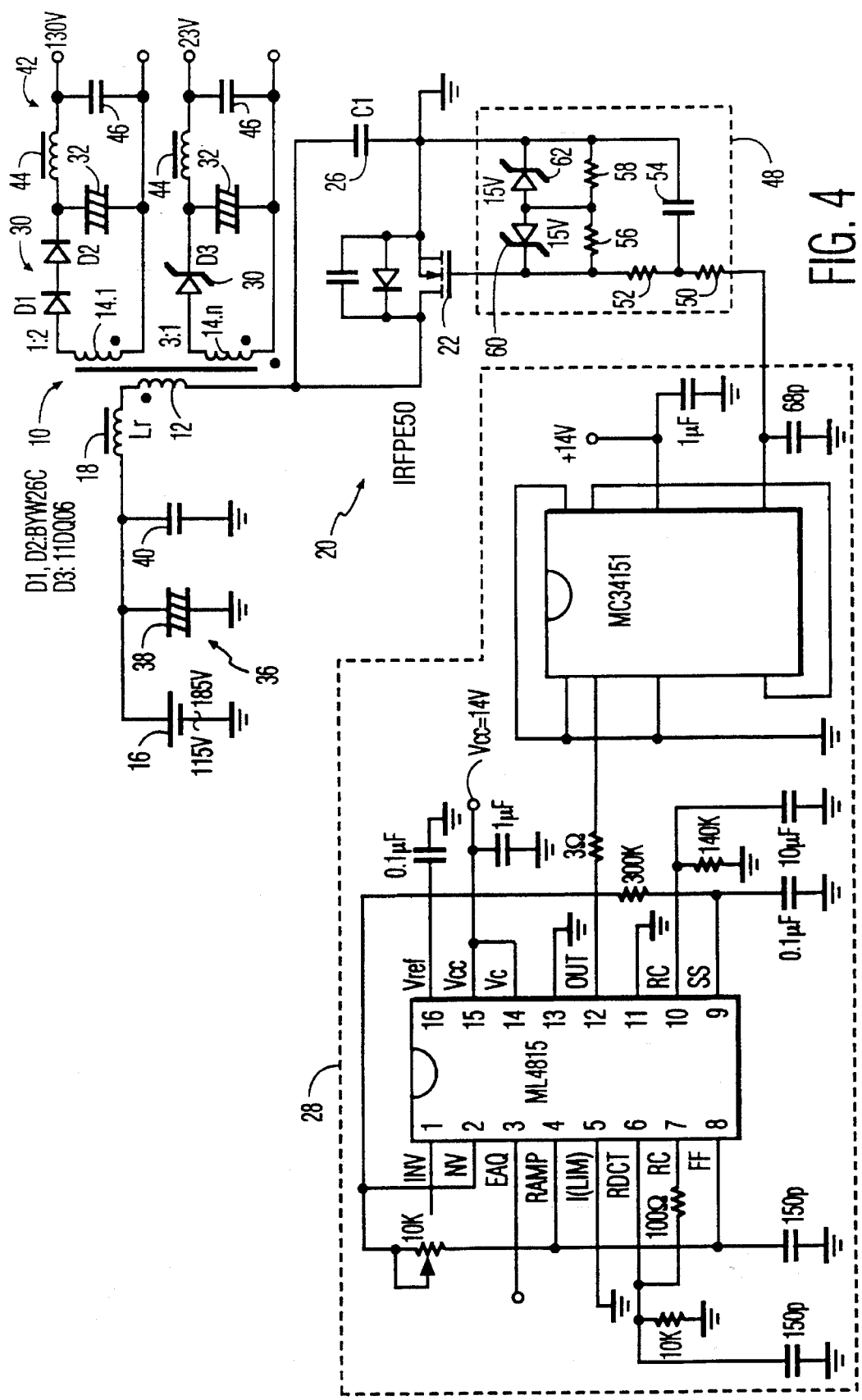
FIG. 4 shows a practical circuit diagram of the flyback converter of the subject invention.

FIG. 4 shows a practical embodiment of the multi-resonant and multi-output flyback converter of the subject invention. It should be noted that a capacitive filter 36, including the parallel combination of capacitors 38 and 40, connects the positive terminal of the dc voltage source 16 to ground for removing any noise on the supply. In addition, an output LC filter 42, including the series arrangement of an inductor 44 and a capacitor 46, has been added to each of the output circuits, again for removal of noise, the output voltage being taken across capacitor 46. In addition to the above, it should be noted that the flyback diode (D1) 24 has been eliminated and effectively replaced by the internal diode of the MOSFET (Q1) 22.

In order to further reduce radiated EMI, a filter-delay circuit 48 is inserted between the switching signal source 28 and the gate terminal of MOSFET (Q1) 22. This filter-delay circuit 48 includes the series arrangement of two resistors 50 and 52 connected to the gate terminal of MOSFET 22, a capacitor 54 connecting the junction between the two resistors 50, 52 to ground (the negative terminal of the dc voltage source 16), the series arrangement of two resistors 56 and 58 connecting the gate terminal to ground and the series arrangement of two oppositely arranged zener diodes 60 and 62 also connecting the gate terminal to ground, the junction points between the resistors 56, 58 and the zener diodes 60, 62 being interconnected. The switching signal from the switching signal source 28 is generally a square wave. When applied through the filter-delay circuit 48, a trapezoidal gate voltage and a damped sine wave gate current result. The less steep slopes of the gate voltage and current result in lower EMI radiations.

The values of each of the components are as follows:

| Inductors: | |
|---|---|
| 18 ($L_r$) | 13.5 µH |
| 44 | 164 µH |

| Capacitors: | |
|---|---|
| 26 (C1) | 0.5 nF |
| 32 ($C_0$) | 150 µF |

| | -continued |
|---|---|
| 38 | 330 µF |
| 40 | 0.1 µF |
| 46 | 0.1 µF |
| 54 | 470 pF |
| Resistors: | |
| 50 | 3 ohms |
| 52 | 1 ohm |
| 56 | 1 kohms |
| 58 | 1 kohms |

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A multi-resonant and multi-output flyback converter comprising a flyback transformer which exhibits mutual inductance, said flyback transformer having a primary winding and at least two secondary windings each having a series arrangement of an output diode and a filtering capacitance connected across the secondary winding, a dc voltage source having a first terminal coupled to a first end of said primary winding, a switching circuit coupled between a second end of said primary winding and a second terminal of said dc voltage source, and a switching signal source coupled to said switching circuit for controlling the ON/OFF cycling of said switching circuit, wherein said flyback converter is multi-resonant and includes a resonant inductance in series with said first end of the primary winding, and said switching circuit comprises transistor switching means having a switching terminal for receiving a switching signal from the switching signal source, a source terminal coupled to the second terminal of said dc voltage source and a drain terminal coupled to the second end of said primary winding, and a parallel arrangement of a flyback diode and a charging capacitor coupled across the source and drain terminals of said transistor switching means, said flyback converter further comprising a filter-delay circuit coupled between the switching signal source and the switching terminal of said transistor switching means, said filter-delay circuit lessening voltage and current slopes of the switching signal from said switching signal source to said transistor switching means, thereby lowering EMI radiations, the multi-resonance of said flyback converter including the combination of the resonant inductance, a leakage inductance of the flyback transformer, and a combination of a capacitance of said charging capacitor and a parasitic capacitance of said transistor switching means, and wherein said resonant inductance and said charging capacitor are dimensioned so that said transistor switching means turns on when a voltage and a current across the source and drain terminals are substantially zero, characterized in that said filter-delay circuit comprises:

a first series arrangement of two oppositely arranged zener diodes coupled between said switching terminal and ground;

a second series arrangement of a first resistor and a second resistor, said second series arrangement being in parallel with said first series arrangement, a junction point between said two zener diodes of said first series arrangement being connected to a junction point between said first and second resistors in said second series arrangement;

a third series arrangement of a third resistor and a capacitor, a first end of said third series arrangement, connected to said third resistor, being connected to said switching terminal and a second end of said third series arrangement, connected to said capacitor, being connected to ground; and a fourth resistor connecting a junction point between said third resistor and said capacitor in said third series arrangement to an output of said switching signal source.

2. A multi-resonant and multi-output flyback converter as claimed in claim 1, characterized in that said transistor switching means is a MOSFET.

* * * * *